CONTROL SYSTEM FOR MAGNETIC RECORDINGS

Filed April 27, 1956

Inventor
ANTHONY FLAN
HAROLD N. MILLER
by Hill, Sherman, Meroni, Gross & Simpson Attys.

United States Patent Office 2,938,677

Patented May 31, 1960

2,938,677

CONTROL SYSTEM FOR MAGNETIC RECORDINGS

Anthony Flan, 1050 Hinman St., Evanston, Ill., and Harold N. Miller, 250 Mary St., Glencoe, Ill.

Filed Apr. 27, 1956, Ser. No. 581.094

5 Claims. (Cl. 242—55.12)

Figures 1, 2:
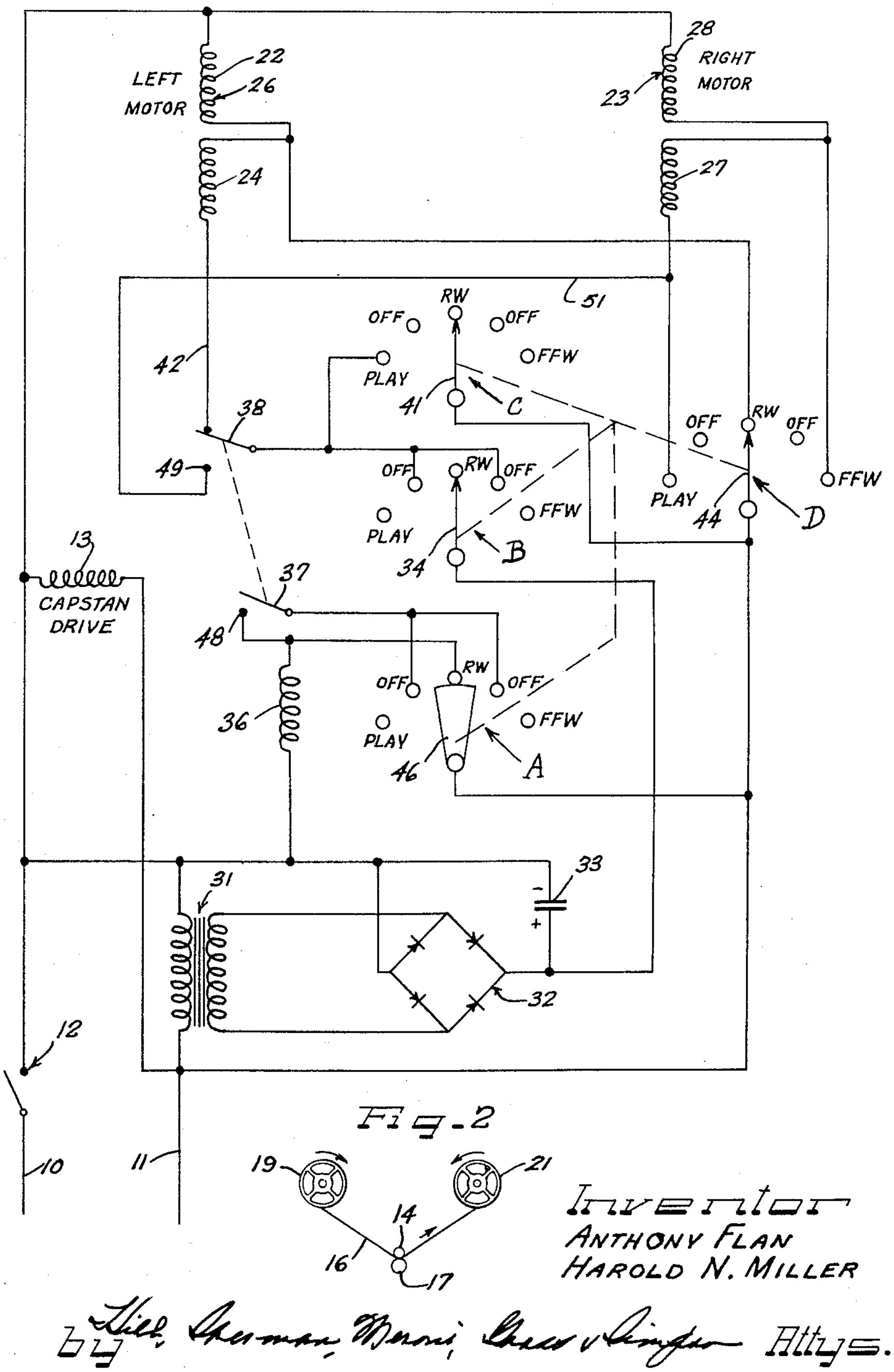

The present invention deals with improvements in control circuits particularly adapted for use in magnetic recording assemblies.

The faithful reproduction and recording of intelligence upon a moving magnetic record member depends essentially upon the ability to maintain a constant speed on the record member as it passes the electromagnetic transducer head in the recording apparatus during recording and playback. In order to avoid distortions, it is also necessary that the speed of the record member during playback be exactly equal to the speed of the record member during the recording. Mechanically, these two requirements present problems because of the necessity of winding up the tape or other record member onto a reel or the like. Various mechanical systems have heretofore been devised for tensioning the magnetic record member properly in passage from the pay-out reel to the take-up reel for adjusting the velocity of the respective reels depending upon the effective diameter of the reel. Such systems have not always been completely satisfactory, however, and the principal object of the present invention is to provide an improved control system for magnetic recording apparatus which provides a constant linear velocity to the traveling record medium and automatically compensates for changes in the reel size.

Another object of the present invention is to provide an improved control circuit for a magnetic recording apparatus including a braking circuit which rapidly stops the rotation of one of the reels before the direction of tape movement can be reversed.

Still another object of the invention is to provide an improved control circuit for a magnetic recording assembly including switch means selectively operable to place the assembly in a playback, rewind, and a fast forward condition.

Other objects and features of the present invention will be apparent to those skilled in the art from the following description of the attached sheet of drawings which illustrates a preferred embodiment of the invention.

In the drawings:

Figure 1 is a schematic circuit diagram of the control circuit of the invention; and Figure 2 is a schematic plan view of the reel and capstan assembly controlled by the operation of the control circuit.

As shown on the drawings:

In Figure 1, reference numerals 10 and 11 indicate the input leads from a source of alternating current potential such as the ordinary 115 volt A.C. line. An on-off switch 12 controls the energization of the complete assembly.

When the switch 12 is closed, an energizing voltage is constantly applied to the windings 13 of a motor employed to drive a capstan 14 (Figure 2) at a substantially constant velocity. In the playback of recording position, a magnetic record member 16 is urged against the surface of the capstan 14 by means of a rubber covered pinch roller 17 so that the motive power for the tape is supplied essentially by the capstan 14.

In the schematic diagram of Figure 1 it is assumed that the magnetic impulse record member moves from left to right in the playback and recording positions. As seen in Figure 2, the magnetic impulse record member 16 is unwound from a pay-out reel 19, around the capstan 14 and is ultimately received on a take up reel 21. The pay-out reel 19 and the take up reel 21 are separately coupled to their own motor drive units, the drive units, the drive unit for the pay-out reel 19 being identified as the "left motor" in Figure 1, and the motor driving the take up reel 21 beng identified as the "right motor" 23 in the drawings.

The motors 22 and 23 are of a particular construction which adapt them for use in the control circuit of the present invention. Both are alternating current type motors preferably of the induction type. Both motors 22 and 23 include a pair of energizing windings, one winding being a low torque winding and the other being a high torque winding. The windings of motor 22, for example, are identified at reference numerals 24 and 26. Similarly, the low torque winding of the right motor 23 is identified at numeral 27 and the high torque winding at numeral 28.

When the assembly is to operate at speeds in excess of the normal recording and transcribing speeds, as, for example, when the assembly is set for the rewind condition or for the fast forward condition, means are provided to energize selectively the high torque windings 26 and 28 of the respective motors so that the tape is driven at a high rate of speed. In switching from the playback to the rewind condition, however, and in switching from the rewind to the fast forward position, it is desirable to apply a brake on the motor to decelerate and ultimately stop the reels before the tape changes direction. For this purpose, means are provided for introducing a direct current into the low torque windings 24 and 27 of the motors at the appropriate instances to provide this braking feature. The manner in which the foregoing functions are accomplished will be more apparent from succeeding portions of the description.

The switching of the assembly from one condition to others is accomplished by means of a four section, five position switch in which each of the sections is mechanically ganged together, each of the sections having a "play" position, a "first off" position, a "rewind" (RW) position, a "second off" position and a "fast forward" position (FFW). The section of the switch which controls the selective energization of the motor unit is labeled section A in the drawing, the section which applies the direct current braking current is labeled section B, the section which controls the application of the energizing voltage to put a drag on the pay out reel is identified as section S, and the section which controls the application of the energizing voltage to the high torque windings of the respective motors is identified as section D.

Also disposed across the input lines 10 and 11 is a step down transformer 31 having its primary connected across the input line and its secondary connected to a full wave rectifier circuit 32. The output of the rectifier appears across a smoothing condenser 33 and appears as a D.C. potential of about 12 volts on a switch arm 34 forming part of the switch section B.

Also included within the circuit is a relay 36 arranged to be energized by the 115 volt A.C. line and being arranged, when energized, to close a pair of contacts 37 and 38 which are mechanically coupled together. The operation of this circuit will be illustrated best by tracing the circuit in the various conditions of operation.

*The play position*

In the "play" position the idler pinch roller 17 is pressed against the record member 16 and urges the same against the peripheral surface of the capstan 14. The capstan drive motor 13 is continuously energized, as long as the switch 12 is closed, and drives the tape at a constant linear velocity. In the "play" position the relay 36 is de-energized. Accordingly, an A.C. voltage is applied from the source through the switch arm 41 of section C of the switch through the normally closed relay contact 38 to a conductor 42 and serves to energize the high torque winding 26 and the low torque winding 24 of the left motor 22. When the motor is thus energized, it tends to put a drag on the record medium 16 by rotating the pay-out reel 19 in a clockwise direction, as indicated in Figure 2 of the drawings.

At the same time, a tension on the magnetic record member in the opposite direction is afforded by the take up reel 21 which is driven in the counter clockwise direction. The right motor 23 is energized in this condition by the application of an energizing voltage to a switch contact 44 of section D of the switch which applies the line voltage to the low torque winding 27 and the high torque winding 28 of the right motor 23 in series.

If it were not for the constant drive capstan, the forces produced on the tape 16 by the opposite action of the left motor 22 and the right motor 23 might keep the record member 16 under tension but not in motion. The drive force supplied to the record member 16 by the capstan 14 therefore overcomes this state of equilibrium and transfers the tape to the take up reel 21 against the dragging action supplied by the motor mechanically coupled to the pay out reel 19. Accordingly, the tape is under constant tension and proceeds at a uniform velocity to the take up reel 21.

*First off position*

In attempting to shift the recording assembly from the "play" position to the "rewind" position, it is necessary to go through a first off position in the selector switch. In this position of the switch, the relay 36 is de-energized. A braking force is applied to both windings of the left motor 22 through section B of the switch, the relay contact 38, and the conductor 42. In the same condition of operation, the right motor 23 is de-energized, so that no take up force is applied to the tape. Also, as is common with magnetic recording assemblies, the selector switch is mechanically coupled to the pinch roller 17 and disengages the same from the magnetic record member 16 when the assembly is switched to an off position. Accordingly, the tape movement stops almost immediately because the only current being applied in this interval is the braking current supplied to both windings of the left motor 22, and since the capstan 14 then operates as a free running shaft, no driving tension is applied to the magnetic record member 16 in this condition.

*The rewind condition*

In the rewind condtion the relay 36 is energized by the application of the line voltage across the coil through the switch arm 46 of section A of the switch. The switch arm 46 is of the shorting type in that it bridges the space between the "off" contact and the "rewind" contact thereby shorting the two contacts together before it leaves the "off" position.

With the relay 36 energized, the holding contact 37 is held against a terminal 48 and the relay arm contact 38 engages a contact 49. The other portion of the switch which is effective in this condition is section D which applies the line voltage to the high torque winding 26 of the left motor. Accordingly, only this winding is energized, and since the pinch roller 17 is disengaged from the capstan 14 in this interval, the left motor 22 is driven at a high velocity so that the reel 19 rapidly receives the magnetic record member 16.

*The second off position*

In the second off position the switch arm 46 keeps the relay 36 energized because, as mentioned previously, the switch arm is of the shorting type so that the line voltage is applied to the "off" contact before the switch arm leaves contact with the "rewind" contact. Hence, the circuit is established through the holding contact 37 of the relay and terminal 48. In this condition, a braking current is applied through the switch arm 34 of section B, the contact arm 38, terminal 49, and conductor 51 to both windings of the right motor 23. In this position, both windings of the left motor 22 are de-energized and the idler roller 17 is out of contact with the capstan 14, so that the brake applied to the right motor effectively stops the transfer of the tape from the take up reel 21 to the reel 19 which occurred during the rewind operation.

*The fast forward position*

In the fast forward position, the conditions are substantially the opposite of those occurring during the rewind position. In this condition, the relay 36 is de-energized, and the only section of the switch which is effective is section D. The latter applies the input voltage across the high torque winding 28 only of the right motor 23. In this condition of the switch, the left motor 22 is de-energized and the pinch roller 17 is out of contact with the capstan 14. Hence, the take up reel 21 will operate at a high angular velocity and will wind up the record member 16 very rapidly since no drag is provided by the rotation of the reel 19.

It will be observed that in moving from the second off position to the rewind position, the switch arm 46 through the action of the normally open holding contact 37 keeps the line voltage applied across the relay 36. Hence, there is no release of the relay during this interval. Similarly, in moving the switch from the rewind position to the first off position, the switch arm 46 shorts together the off contact with the rewind contact in section A of the switch and keeps the relay 36 energized before the switch arm 46 breaks contact with the rewind contact.

From the foregoing, it will be apparent that the control circuit of the present invention provides automatic application of a braking current to each motor selectively, depending upon the direction of movement of the tape and also provides a convenient means for applying a high speed operation in both the forward and the reverse directions.

It will be evident that various modifications can be made to the described embodiments without departing from the scope of the present invention.

We claim as our invention:

1. In a magnetic recording assembly, a pair of A.C. motors each having a pair of windings, one of said windings being a low torque winding and the other being a high torque winding, a capstan arranged to feed the record member at a uniform velocity during playback, switch means selectively placing said assembly in a playback condition, a first off position, a rewind position, a second off position, and a fast forward position in that order, a source of D.C. potential, circuit means applying said source of D.C. potential selectively to the first of said motors in said first off position and to the second of said motors in said second off position, circuit means for energizing both the low and high torque windings of each motor in the playback condition, and circuit means selectively energizing one of said high torque windings of said motors when said switch means is in its rewind position and in its fast forward position, respectively.

2. In a magnetic recording assembly, a take up motor and a pay out motor each having a low torque winding and a high torque winding, a capstan arranged to feed the record member at a uniform velocity during playback, switch means selectively placing said assembly in a playback condition, a first off position, a rewind position, a second off position, and a fast forward position in that order, a source of D.C. potential, circuit means applying said D.C. potential selectively to said pay out motor when said switch means is in its first off position and to said take up motor when said switch means is in said second off position, circuit means for energizing both the low and high torque windings of each motor in the playback condition, and circuit means selectively energizing one of said high torque windings of said motors when said switch means is in its rewind position and its fast forward position, respectively.

3. In a magnetic recording assembly, a pair of A.C. motors each having a pair of windings, one of said windings being a low torque winding and the other being a high torque winding, a capstan arranged to feed the record member at a uniform velocity during playback, switch means selectively placing said assembly in a playback condition, a first off condition, a rewind condition, a second off condition, and a fast forward condition in that order, a source of D.C. potential, a relay energized when said switch means is in either off position to selectively apply said D.C. potential to the first of said motors in said first off position and to the second of said motors in said second off position, circuit means for energizing both the low and high torque windings of each motor in the playback condition, and circuit means selectively energizing one of said high torque windings of said motors when said switch means is in its rewind position and its fast forward position, respectively.

4. In a magnetic recording assembly, a pair of spaced reels, a first A.C. motor and a second A.C. motor driving said reels and each having a pair of energizing windings, each of said pairs consisting of a low torque winding and a high torque winding, said motors being arranged to apply tension in opposite directions on a magnetic record member passing between said reels, a capstan drive motor arranged to operate at a substantially constant velocity, switch means selectively placing said assembly in a playback condition, a first off condition, a rewind condition, a second off condition, and a fast forward condition, a source of D.C. potential, circuit means applying said source of D.C. potential selectively to the first of said motors in said first off position and to the second of said motors in said second off position, circuit means for energizing both the low and high torque windings of each motor in the playback condition, and circuit means selectively energizing one of said high torque windings of said motors when said switch means is in its rewind position and its fast forward position, respectively.

5. In a magnetic recording assembly, a pair of spaced reels arranged to receive an elongated magnetic impulse record member therebetween, a first A.C. motor coupled to one of said reels and arranged to tension said record member in one direction, a second A.C. motor coupled to the other of said reels and arranged to tension said record member in the opposite direction, each of said motors having both a low torque winding and a high torque winding, a capstan arranged to drive said record member at a substantially uniform velocity toward said second reel, switch means selectively placing said assembly in a playback condition, a first off position, a rewind condition, a second off condition, and a fast forward condition in that order, a source of D.C. potential, circuit means applying said source of D.C. potential selectively to the first of said motors in said first off position and to the second of said motors in said second off position, circuit means for energizing both the low and high torque windings of each motor in the playback condition, and circuit means selectively energizing one of said high torque windings of said motors when said switch means is in its rewind position and in its fast forward position, respectively.

References Cited in the file of this patent

UNITED STATES PATENTS

| | | |
|---|---|---|
| 2,223,728 | Kenyon | Dec. 3, 1940 |
| 2,645,495 | Nelson | July 14, 1953 |
| 2,658,952 | Harsant et al. | Nov. 10, 1953 |
| 2,676,212 | Williams | Apr. 20, 1954 |
| 2,775,407 | Elliott et al. | Dec. 25, 1956 |